United States Patent [19]

Nogami

[11] 4,319,786

[45] Mar. 16, 1982

[54] BRAKE PRESSURE CONTROL DEVICE OF DECELERATION RESPONSIVE TYPE

[75] Inventor: Tomoyuki Nogami, Toyota, Japan

[73] Assignee: Toyota Jidosha Kogyo Kabushiki Kaisha, Toyota, Japan

[21] Appl. No.: 188,583

[22] Filed: Sep. 18, 1980

Related U.S. Application Data

[63] Continuation of Ser. No. 20,096, Mar. 13, 1979, abandoned.

[30] Foreign Application Priority Data

May 29, 1978 [JP] Japan .................. 53-64171

[51] Int. Cl.³ .............................................. B60T 8/14
[52] U.S. Cl. .................................... 303/6 C; 188/349; 303/24 A; 303/24 F
[58] Field of Search ........................ 303/24, 6 C, 6 R; 188/349, 352; 137/38-46

[56] References Cited

U.S. PATENT DOCUMENTS

| | | | |
|---|---|---|---|
| 2,242,297 | 5/1941 | Freeman | 303/6 C X |
| 3,087,761 | 4/1963 | Stelzer | 303/24 F |
| 3,147,045 | 9/1964 | Stelzer | 303/24 F |
| 3,476,443 | 11/1969 | Bratten et al. | 303/6 C |
| 4,070,067 | 1/1978 | Katoh et al. | 303/24 C X |
| 4,072,363 | 2/1978 | Nogami | 303/24 C |
| 4,080,006 | 3/1978 | Nogami et al. | 303/24 F |

FOREIGN PATENT DOCUMENTS

| | | | |
|---|---|---|---|
| 1555488 | 11/1969 | Fed. Rep. of Germany | 303/6 C |
| 1129082 | 11/1965 | United Kingdom | 303/6 C |

Primary Examiner—Douglas C. Butler
Attorney, Agent, or Firm—Kenyon & Kenyon

[57] ABSTRACT

A brake pressure control device of deceleration responsive type includes an inertia-controlled valve element cooperating with a valve seat in a valve chamber to control the ratio of brake fluid pressures being applied to front and rear wheel brake cylinders in response to the attainment of a predetermined rate of deceleration of the vehicle. In the control device, a partition member is assembled within the valve chamber to ensure the precise initial setting of the valve element, the partition member being further provided with a fluid passage to ensure the optimum control of fluid flow acting on the valve element.

6 Claims, 4 Drawing Figures

BRAKE PRESSURE CONTROL DEVICE OF DECELERATION RESPONSIVE TYPE

This is a continuation of application Ser. No. 20,096 filed on Mar. 13, 1979 and now abandoned.

BACKGROUND OF THE INVENTION

The present invention relates to a brake pressure control device of deceleration responsive type in which such an inertia-controlled valve element as a steel ball cooperating with a valve seat in a valve chamber to control the ratio of brake fluid pressures being applied to the front and rear wheel brake cylinders in response to the attainment of a predetermined rate of deceleration of the vehicle.

In a conventional pressure control device of this type, the pressure control is greatly influenced by the initial space between the valve element and seat, the flow of fluid acting on the valve element, the mass of the valve element, the supporting angle of the valve element, and the like. As well understood from the above-noted facts, it is very important to precisely set the valve element in position and control the flow of fluid acting on the valve element so as to ensure the optimum pressure control. Furthermore, in the case that the housing assembly for the control device includes first and second housing sections fluid-tightly fitted to each other to form the valve chamber therein, the initial setting of valve element is very difficult in assembly of the first and second housing sections.

SUMMARY OF THE INVENTION

It is, therefore, a primary object of the present invention to provide an improved pressure control device in which a partition member is assembled within the valve chamber to ensure the precise initial setting of the valve element and is provided with a fluid passage to ensure the optimum control of fluid flow acting on the valve element.

According to the present invention there is provided a brake pressure control device for a vehicle braking system between a master cylinder and a wheel brake cylinder, the control device comprising a first housing section having an inlet port for connection to the master cylinder and provided at the inner end face thereof with an annular protrusion in communication with the inlet port, a second housing section having an outlet port for connection to the wheel brake cylinder and provided at the inner end face thereof with a stepped inner bore in communication with the outlet port, the first and second housing sections being fitted to each other at their inner end faces such that the annular protrusion is fluid-tightly coupled within a large diameter portion of the inner bore to provide a valve chamber, and a cut-off valve including a valve seat provided on the side wall of the inner bore to permit the flow of fluid between the valve chamber and the outlet port and an inertia-controlled valve element housed within a small diameter portion of the inner bore to cooperate with the valve seat and moving toward the valve seat to interrupt the flow of fluid from the valve chamber to the outlet port when the valve element is subjected to a deceleration in excess of a predetermined value. In the control device having the above-mentioned construction, a partition member is disposed within the large diameter portion of the inner bore to subdivide the interior of the valve chamber into front and rear chambers and receiving the valve element at its front face, the partition member being provided at its upper portion with a fluid passage opening above the valve element to provide a fluid communication between the front and rear chambers and being secured in position by abutments at its front face with the stepped portion of the inner bore and at its back face with the inner end of the annular protrusion, and a portion of the partition member being detachably engaged with the stepped portion of the inner bore to prevent relative rotation to the second housing section.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
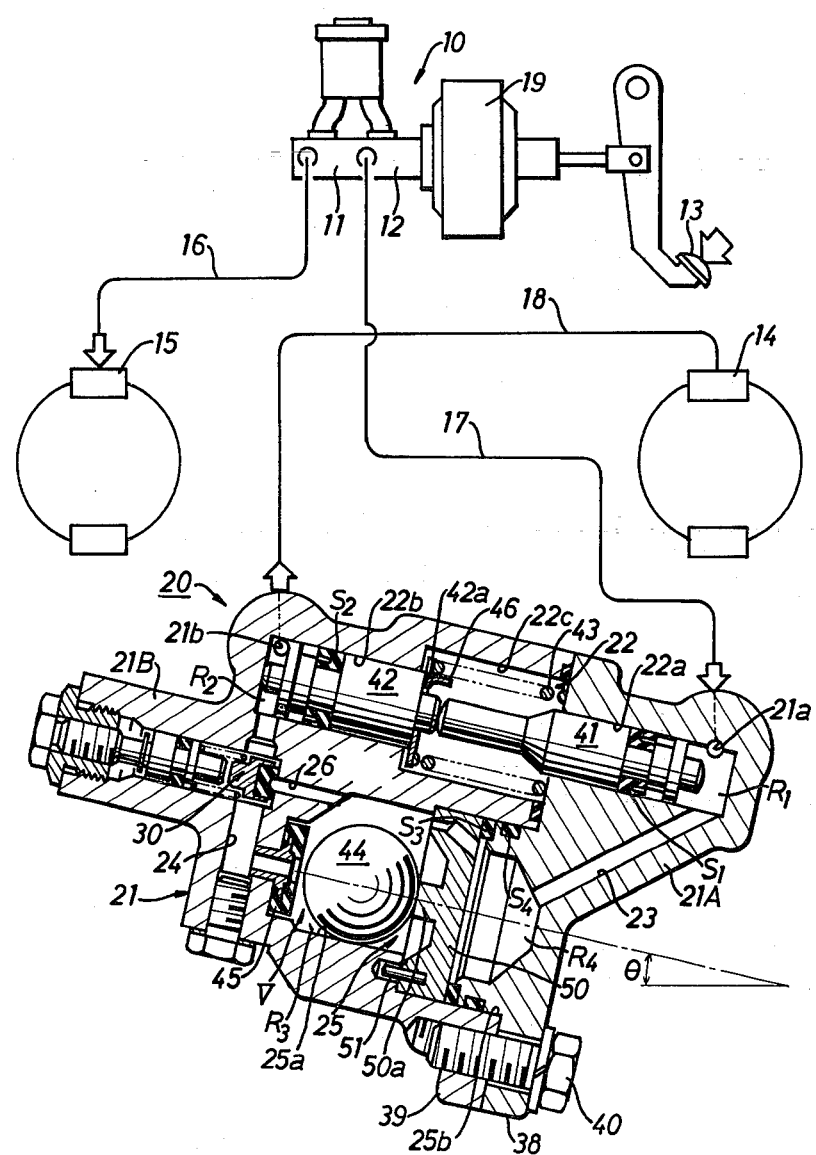
FIG. 1 illustrates a view in longitudinal section of a pressure control device in accordance with the present invention, which is incorporated in a vehicle braking system.

Referring now to the drawings, particularly in FIG. 1 there is illustrated a conventional tandem master cylinder 10 which is provided with a brake booster 19 to be operated by depression of a foot brake pedal 13. The master cylinder 10 has a front pressure chamber 11 connected to front wheel brake cylinders 15 by way of a conduit 16 and a rear pressure chamber 12 connected to rear wheel brake cylinders 14 by way of conduits 17 and 18. Interposed between the conduits 17 and 18 is a pressure control device 20 according to the present invention which is fixedly mounted on the vehicle body structure at an inclined angle θ.

The control device 20 comprises a housing assembly 21 which is provided therein with a small diameter piston 41, a large diameter piston 42 and an inertia-controlled steel ball 44. The housing assembly 21 includes a rear housing section 21A provided thereon with an inlet port 21a and a front housing section 21B provided thereon with an outlet port 21b. The inlet port 21a is connected to the rear pressure chamber 12 of master cylinder 10 by way of the conduit 17, and the outlet port 21b is connected to the rear wheel brake cylinders 14 by way of the conduit 18. Within the housing assembly 21 a stepped cylindrical bore 22 is provided in parallel with a stepped inner bore 25. The stepped cylindrical bore 22 includes a small diameter portion 22a to which the inlet port 21a opens, a large diameter portion 22b to which the outlet port 21b opens and an intermediate portion 22c in which a compression coil spring 43 is assembled. The stepped inner bore 25 is communicated with the small and large diameter portions 22a and 22b of stepped bore 22 respectively through first and second passages 23 and 24. The second passage 24 is also connected to the upper portion of inner bore 25 through a bypass passage 26, which is normally closed by a check valve assembly 30.

The rear housing section 21A is further provided at its inner end face with an annular protrusion which is fluid-tightly coupled within a large diameter portion 25b of stepped inner bore 25 through an annular seal member $S_4$. The rear and front housing sections 21A and 21B are respectively provided with flanges 38 and 39 along the outer circumferences of the jointing portions. Thus, the rear housing section 21A is firmly assembled with the front housing section 21B by fastening bolts 40 threaded into the flanges 38, 39. Due to this assembling construction, the sealing effect is maintained between the rear and front housing sections 21A, 21B even if a space is produced between the engagement faces of the rear and front housing sections by hydraulic internal pressure exerted within the control device 20.

The small diameter piston 41 is reciprocably engaged within the small diameter portion 22a of stepped bore 22 through an annular seal member $S_1$ to form a first fluid chamber $R_1$, while the large diameter piston 42 is reciprocably engaged within the large diameter portion 22b of stepped bore 22 through an annular seal member $S_2$ to form a second fluid chamber $R_2$. The compression coil spring 43 is engaged at one end thereof with the inner end wall of rear housing section 21A and at the other end thereof with the inner shoulder 42a of large diameter piston 42 through an annular retainer 46. Thus, the large diameter piston 42 is loaded toward the second fluid chamber $R_2$ and abuts against the inner end wall of stepped bore 22.

The inertia-controlled ball 44 is housed within a small diameter portion 25a of bore 25 and is free to roll forwardly up the inclined bottom of bore 25. The ball 44 cooperates with an annular valve seat 45 secured on the side wall of inner bore 25 to provide a cut-off valve V. During inoperative condition of the control valve 20, the ball 44 rests under gravity in the position shown in the figure and is received by a partition plate 50, as described in detail hereinafter. In braking operation, when the rate of deceleration of the vehicle exceeds a predetermined value the ball 44 will roll forwardly by the inertia force acting thereon toward the valve seat 45 so that the cut-off valve V is closed to interrupt fluid communication between the inner bore 25 and the second passage 24.

Figure 2:
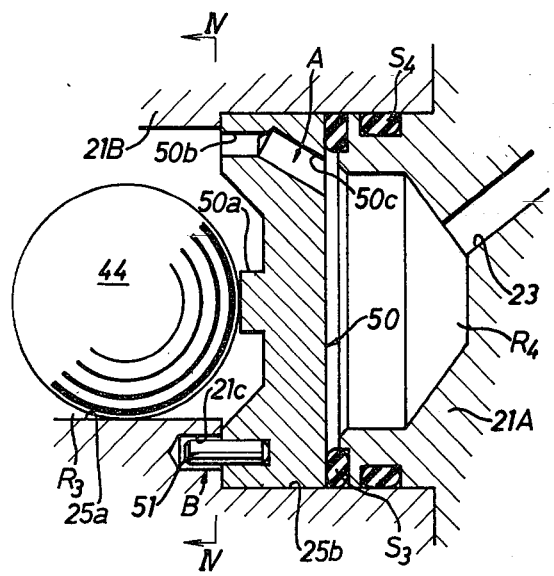
FIG. 2 is an enlarged sectional view showing a valve chamber of the control device.
Figure 3:
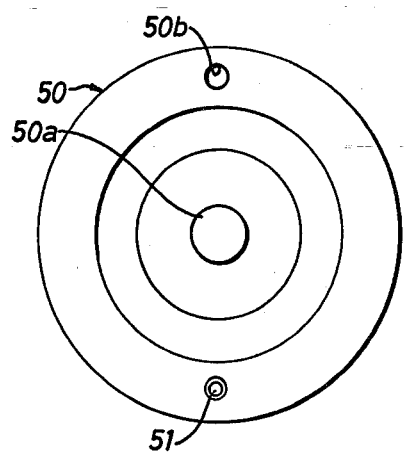
FIG. 3 is a front view of a partition plate assembled within the valve chamber.

As can be well seen in FIGS. 2 and 3, the partition plate 50 is snugly engaged within the large diameter portion 25b of inner bore 25 to subdivide the interior of bore 25 into front and rear chambers $R_3$ and $R_4$. The partition plate 50 is also engaged at its back face with the annular protrusion of rear housing section 21A through an annular seal member $S_3$ In such a manner that it is fixed in position due to abutment against the stepped portion of bore 25. Thus, the partition plate 50 receives the ball 44 on its central boss 50a to precisely determine the initial space between the ball 44 and the valve seat 45.

Figure 4:
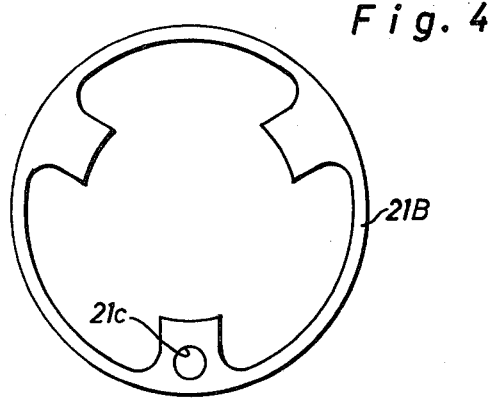
FIG. 4 is a back side view of the stepped portion of an inner bore shown in FIG. 2.

The partition plate 50 is further provided at the upper portion thereof with a fluid passage A to provide a fluid communication between the front and rear chambers $R_3$ and $R_4$. The fluid passage A includes a hole 50b opening above the ball 44 in the front chamber $R_3$ and a slant hole 50c opening toward the center of rear chamber $R_4$. The hole 50b Is also arranged in parallel with the axis of inner bore 25 to cause the parallel flow of fluid above the ball 44. As can be well seen in FIGS. 2 and 4, a knock-pin 51 is fixed to the bottom portion of partition plate 50 and is inserted into a pin-hole 21c drilled in the stepped portion of inner bore 25. Thus, the knock-pin 51 serves to secure the partition plate 50 in position without relative rotation to the front housing section 21B and to precisely set the opening position of the fluid passage A.

Under the unloaded condition of the vehicle, depression of the brake pedal 13 produces fluid pressure within the respective pressure chambers 11 and 12 of master cylinder 10. The pressure in the front pressure chamber 11 is directly applied to the front wheel brake cylinders 15 through the conduit 16, while the pressure in the rear pressure chamber 12 is applied to the inlet port 21a of the control device 20 through the conduit 17. The master cylinder pressure applied to the inlet port 21a is applied to the second fluid chamber $R_2$ through the first fluid chamber $R_1$, the first passage 23, the rear chamber $R_4$, the fluid passage A of partition plate 50, the front chamber $R_3$, the valve seat 45, and the second passage 24, in sequence, and then applied to the rear wheel brake cylinders 14 through the outlet port 21b and the conduit 18. Thus, the vehicle is braked in accordance with the value of the master cylinder pressure being applied to the front and rear wheel brake cylinders 15 and 14.

During the braking operation, the small diameter piston 41 is urged forwardly by the pressure in the first chamber $R_1$, and the large diameter piston 42 is urged rearwardly by the pressure in the second chamber $R_2$. As a result, the piston 42 is moved rearwardly against the loading of coil spring 43 due to a difference between pressures acting on the respective pistons 41 and 42. When the rate of deceleration of the vehicle exceeds a predetermined value, the ball 44 rolls forwardly toward the valve seat 45 by the inertia force acting thereon so that the cut-off valve V is closed to interrupt the fluid communication between the first and second fluid chambers $R_1$ and $R_2$. Thereafter, the ball 44 is held on the valve seat 45 by the inertia force and the difference in pressure between the first and second fluid chambers $R_1$ and $R_2$.

When the fluid under pressure flows into the front chamber $R_4$ from the rear chamber $R_3$ through the fluid passage A before the cut-off valve V is closed, the velocity of fluid flow is accelerated and tends to a dynamic pressure onto the ball 44. In this instance, the hole 50b of fluid passage A acts to cause the parallel flow of fluid above the ball 44. As a result of the parallel flow of fluid, the dynamic pressure acting on the ball 44 will not change even if the velocity of fluid flow in the front chamber $R_3$ varies due to change of depression speed of the foot pedal 13 and change of the viscosity of fluid caused by variation in temperature.

In practice of the present invention, it is noted that the partition plate 50 may be securedly engaged with the stepped portion of inner bore 25 in a suitable manner instead of the knock-pin 51 and that the present invention may be adapted to another type of pressure control device without the pistons 41, 42.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A brake pressure control device for installation in a vehicle braking system between a master cylinder and a wheel cylinder, the control device including:
   a first housing section having an inlet port for connection to said master cylinder and provided at the inner end face thereof with an annular protrusion in communication with said inlet port;

a second housing section having an outlet port for connection to said wheel brake cylinder and provided at the inner end face thereof with a stepped inner bore in communication with said outlet port, said first and second housing sections being fitted to each other at their inner end faces such that said annular protrusion is mated within a large diameter portion of said inner bore to provide a valve chamber; and a cut-off valve including a valve seat provided on the side wall of said inner bore to permit the flow of fluid between said valve chamber and said outlet port and an inertia-controlled valve element housed within a small diameter portion of said inner bore to cooperate with said valve seat and movable toward said valve seat to interrupt the flow of fluid from said valve chamber to said outlet port when said valve element is subjected to a deceleration in excess of a predetermined value, wherein the improvement comprises:

a partition member disposed within the large diameter portion of said inner bore to subdivide the interior of said valve chamber into front and rear chambers and receiving said valve element at its front face, said partition member being provided at its upper portion with a fluid passage opening around said valve element to provide a fluid communication between said front and rear chambers and being secured in position between the stepped portion of said inner bore and the inner end of said annular protrusion, with its front face abutting said stepped portion; and means for locating said partition member in only one predetermined angular relation to said inner bore and for preventing rotation of said partition member relative to said second housing section.

2. A brake pressure control device as claimed in claim 1, wherein a resilient annular seal member is interposed between said partition member and said annular protrusion such that said partition member is resiliently urged by said seal member into abutment against the stepped portion of said inner bore.

3. A brake pressure control device as claimed in claim 1, wherein said means for locating said partition member in only one predetermined angular relation to said inner bore comprises an axial pin hole drilled in the stepped portion of said inner bore and a knock-pin fixed to a portion of said partition member and inserted into said pin hole.

4. A brake pressure control device as claimed in claim 3, wherein said axial pin hole is located at the bottom of the stepped portion of said inner bore, and said knock-pin is fixed to the bottom portion of said partition member.

5. A brake pressure control device as claimed in claim 1, wherein said fluid passage of said partition member includes a hole opening above said valve element in said front chamber and a slant hole opening toward the center of said rear chamber, said first-named hole being arranged in parallel with the axis of said inner bore to cause a parallel flow of fluid above said valve element.

6. A brake pressure control device as claimed in claim 1, wherein said partition member is provided at its central portion with a boss having a face receiving said valve element thereon, said boss face being coplanar with said front face of the partition member which abuts with the stepped portion of said inner bore.

* * * * *